(No Model.)
S. GRAVES.
Lathe Tool for Boring and Reaming.
No. 241,974. Patented May 24, 1881.
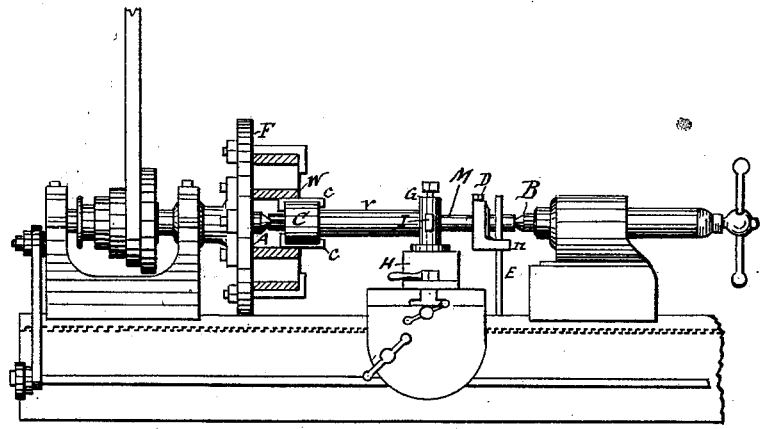
Fig. 1
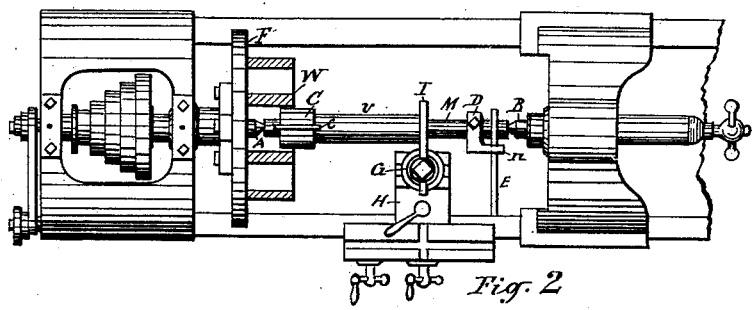
Fig. 2
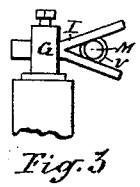
Fig. 3
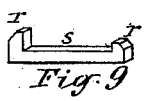
Fig. 9
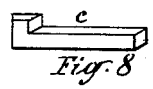
Fig. 8
Fig. 4
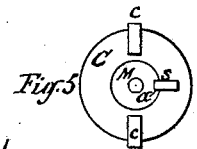
Fig. 5   Fig. 6   Fig. 7
WITNESSES:
C. Bendixon.
Wm C. Raymond.
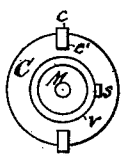
INVENTOR:
Samuel Graves
per Dudley, Laass & Hey
his attorneys
N. PETERS. Photo-Lithographer, Washington, D. C.

UNITED STATES PATENT OFFICE.

SAMUEL GRAVES, OF SYRACUSE, NEW YORK.

LATHE-TOOL FOR BORING AND REAMING.

SPECIFICATION forming part of Letters Patent No. 241,974, dated May 24, 1881.

Application filed March 28, 1881. (No model.)

*To all whom it may concern:*

Be it known that I, SAMUEL GRAVES, of Syracuse, in the county of Onondaga, in the State of New York, have invented new and useful Improvements in Lathe-Tools for Boring and Reaming, of which the following, taken in connection with the accompanying drawings, is a full, clear, and exact description.

The nature of this invention consists, essentially, of a mandrel adapted to be secured stationary between the live-spindle and dead-spindle of a lathe, and a cutter or cutters sliding longitudinally on said mandrel and restrained from rotating thereon, said cutters being moved forward on the mandrel by an arm secured to the slide-rest of the lathe, by means of which tool the boring and reaming of holes and cavities in an article chucked in a lathe can be accomplished with greater accuracy than can be attained by tools heretofore used for that purpose.

In the accompanying drawings, Figure 1 is a side view of a lathe with my improved boring and reaming tool connected thereto, illustrating its application and mode of operation. Fig. 2 is a plan view of the same. Fig. 3 is an end view of the tool and the means for moving it up to its work. Fig. 4 is an enlarged side view of the tool; Fig. 5, a front-end view of same; Fig. 6, a transverse section on line $xx$ in Fig. 4; Fig. 7, a rear-end view; Fig. 8, a detached view of one of the cutters of the tool, and Fig. 9 a detached view of the key or spline which restrains the cutter from rotating on the mandrel of the tool.

Similar letters of reference indicate corresponding parts.

My improved boring and reaming tool is more particularly designed for use in a lathe provided with an automatic feed for the slide-rest. It consists of a mandrel, M, in the form of a straight bar, which, in operation, is secured between the live-spindle A and dead-spindle B. Upon said mandrel slides longitudinally a collar, C. The collar is provided in its interior with a longitudinal groove, $e$, in which is placed a key or spline, $s$, having at its extremities shoulders $r$, engaging the ends of the collar to prevent from sliding out of the same. Said spline $s$ engages a longitudinal groove, $a$, in the mandrel, and thus prevents the collar C from rotating on the said mandrel. The exterior of the collar is also provided with longitudinal grooves $e'e'$, into which cutters $cc$ are fitted and made to project at the periphery and end of the collar, their forward end being beveled to a cutting-edge. Back of the collar C a sleeve, $v$, slides on the mandrel and abuts against the collar.

The described tool is applied to a lathe and operated in the following manner: The work W to be operated on being chucked or fastened to the face-plate F of the lathe in the ordinary manner, the mandrel M, with the cutter-carrying collar C and sleeve $v$ connected thereto, is secured between the live-spindle and dead-spindle of the lathe, as illustrated in Figs. 1 and 2 of the drawings. By means of a dog, D, clamped on the rear end of the mandrel, and a bar, E, inserted underneath the arm $n$ of said dog, and bearing with its lower extremity against the inner side of the lathe-bed and with its upper end on the mandrel M, the latter is prevented from rotating. To the tool-post G on the slide-rest H, I attach a bifurcated arm, I, as best seen in Fig. 3 of the drawings. After moving the cutter-carrying collar C up to the work and following it up with the sleeve $v$, the slide-rest is set to bring the arm I to bear against the rear end of the sleeve. The lathe being then set in motion, the cutter-carrying collar C is caused to advance toward the work, secured to the face-plate by the medium of the usual feed mechanism, which automatically moves the slide-rest, and thus causes the arm I on the tool-post to press against the rear end of the sleeve $v$, and force the collar C, with its cutters $cc$, forward. The arm I can be brought to bear directly against the rear of the collar C, the sleeve $v$ being more especially designed as a follower for forcing the said cutter-carrying collar through a hole of greater length than the collar.

It is obvious that a prismatic arbor, although more expensive to make, will prevent the rotation of the collar C equally as well as the groove-and-feather connection herein described, and I therefore do not wish to confine myself in that respect.

It will be observed that by supporting the cutter-carrying mandrel M at both ends I overcome the vibration of the tool and prevent the resultant jars and unevenness in the cut.

Having described my invention, what I claim as new, and desire to secure by Letters Patent, is—

1. In a lathe-tool for boring and reaming, the combination of the mandrel M, provided with the groove $a$, sliding collar C, provided with a spline or feather, $s$, fitted to the groove $a$, and cutters $c$, projecting from the periphery of the collar, substantially as described, for the purpose set forth.

2. In a lathe-tool for boring and reaming, the combination of the mandrel M, provided with the groove $a$, sliding collar C, provided with the spline $s$, and having cutters $c$ projecting from its periphery, and the sliding sleeve $r$, applied to the mandrel at the rear of the collar C, substantially as described and shown.

3. In a lathe-tool for boring and reaming, the combination of the mandrel M, provided with the groove $a$, the sliding collar C, provided with grooves $e'$ $e'$ $e$, and the cutters $c$ $c$, and key or spline $s$, fitted to the aforesaid grooves, substantially as described and shown.

In testimony whereof I have hereunto signed my name and affixed my seal, in the presence of two attesting witnesses, at Syracuse, in the county of Onondaga, in the State of New York, this 25th day of March, 1881.

SAMUEL GRAVES. [L. S.]

Witnesses:
STANLEY BAGG,
WM. C. RAYMOND.